(12) United States Patent
Getman

(10) Patent No.: US 6,175,051 B1
(45) Date of Patent: Jan. 16, 2001

(54) DEACTIVATION OF METAL LIQUID COOLANTS USED IN NUCLEAR REACTOR SYSTEMS

(75) Inventor: Gerry D. Getman, McMurray, PA (US)

(73) Assignee: Commodore Applied Technologies, Inc., New York, NY (US)

(*) Notice: Under 35 U.S.C. 154(b), the term of this patent shall be extended for 0 days.

(21) Appl. No.: 09/542,167

(22) Filed: Apr. 4, 2000

Related U.S. Application Data (60) Provisional application No. 60/131,080, filed on Apr. 26, 1999.

(51) Int. Cl.[7] ................................. G21F 9/10; C01D 3/04
(52) U.S. Cl. ........................ 588/20; 588/18; 423/182; 423/184; 423/194; 926/DIG. 379
(58) Field of Search ................... 588/18, 20; 423/179, 423/182, 184, 194, 197; 976/DIG. 379

(56) References Cited

U.S. PATENT DOCUMENTS

| | | | |
|---|---|---|---|
| 3,664,870 | 5/1972 | Oberhofer | 134/3 |
| 3,854,933 | 12/1974 | Furukawa et al. | 75/66 |
| 4,032,614 | 6/1977 | Lewis | 423/179 |
| 4,032,615 | 6/1977 | Johnson | 423/179 |
| 4,364,900 | 12/1982 | Burrill | 376/306 |
| 4,853,040 | 8/1989 | Mazur et al. | 134/2 |
| 5,102,511 | 4/1992 | Suwa et al. | 204/93 |
| 5,613,238 | 3/1997 | Mouk et al. | 588/1 |
| 5,678,240 | 10/1997 | Herrmann | 588/18 |
| 5,752,206 | 5/1998 | Frink et al. | 588/20 |

OTHER PUBLICATIONS

A Study of the Products Obtained by Reducing Action of Metals Upon Salts in Liquid Ammonia Solution Burgess, W.M.; Holden, F.R.; J. Am. Chem. Soc. 59,459 (1937).
Divers, E.D.; On the Union of Ammonia Nitrate with Ammonia; Proc. Roy. Soc. (London) 21, 110 (1872–73).
Watt, G.W.; Reactions of Inorganic Substances with Solutions of Metals in Liquid Ammonia; Chem Revs. 46, 289 (1950).

Primary Examiner—Steven P Griffin
Assistant Examiner—Elin A. Warn
(74) Attorney, Agent, or Firm—Howard M. Ellis; Marianne Fuierer (57) ABSTRACT

Liquid metal coolants, such as alkali metal used in nuclear reactor systems can be safely deactivated to form a disposable solid waste material. The alkali metal is dissolved in an ammoniacal liquid, such as anhydrous liquid ammonia to form a reaction mixture comprising alkali metal cations and solvated electrons. A precipitating agent that ionizes in the liquid ammonia is introduced into the reaction mixture to combine with the alkali metal cations and/or solvated electrons to form a precipitating alkali metal salt. Additionally, solidified alkali metal remaining within the coolant system after initial drainage of liquid alkali metal can be dissolved by circulating an ammoniacal liquid within the coolant system. Removal of the liquid ammonia having the alkali metal dissolved therein is combined with a ionizable precipitating agent to form a alkali metal salt.

20 Claims, 4 Drawing Sheets

DEACTIVATION OF METAL LIQUID COOLANTS USED IN NUCLEAR REACTOR SYSTEMS

CROSS REFERENCE TO RELATED APPLICATION

This application claims the benefit of U.S. Provisional Application Serial No.: 60/131,080 filed on Apr. 26, 1999.

FIELD OF INVENTION

This invention relates generally to remediation of nuclear reactor wastes, and more specifically, to deactivation of metal liquid coolants used for absorbing and transferring heat in nuclear reactors.

BACKGROUND OF THE INVENTION

Nuclear facilities at the end of their useful lives cannot merely be abandoned. As such, to protect the public from remaining hazardous materials the site must be decommissioned which includes decontamination, dismantling and demolition with subsequent return to green field status. Usually the first stage in nuclear plant decommissioning is the removal of fuel, followed by the initial wash out of the coolant system and then in situ decontamination for removing residual active species before dismantling the facility.

In the process of decommissioning a breeder nuclear reactor, the liquid metal coolant, which may be an alkali metal such as sodium or a sodium-potassium alloy, presents unthoughtof problems for disposal. Liquid sodium and/or sodium/potassium alloys are extremely reactive metals subject to highly exothermic reactions with water which may result in the generation of hydrogen gas. Accordingly, when liquid alkali metal coolants are involved in the decommissioning of a nuclear reactor additional precautions must be taken for disposing of the large quantities of alkali metal wastes.

In a breeder nuclear reactor a liquid metal coolant is used in several different areas but always for its cooling and/or heat transferring capabilities. The core of the reactor which contains the fuel element pins and the uranium-238 blanket surrounding the core are cooled by liquid metal coolant which circulates in two separate and distinct coolant loops, namely the primary and secondary or intermediate loop. The primary and secondary loops are isolated from each other to reduce the transfer of radioactive isotopes between the loops. The primary coolant loop surrounds the fuel core for absorbing heat from fission activity within the core and this coolant may contain radioisotopes of the liquid metal due to absorption of neutrons. The coolant enter the primary loop at about 600° F. and leaves the core at about 900° F. This absorbed heat retained by the molten alkali metal in the primary loop is transferred to the secondary or intermediate coolant loop by means of a heat exchanger. An estimated 75,000 gallons of liquid alkali metal coolant must be drained from the combined coolant loops and the liquid metal deactivated.

After the initial draining of the molten liquid coolant, the primary and secondary loops and any additional equipment have to be decontaminated in situ. In this regard, any scale or deposits of remaining solidified alkali metal need to be dissolved and removed from the coolant system.

Additionally, alkali metal especially sodium bonded fuel found within spent fuel elements must be deactivated. Fuel elements used in breeder reactors include uranium-235 pencil like pellets that are inserted into a thin-walled stainless steel tube. Included in these tubes is a small amount of an alkali metal, such as sodium which functions as a heat-transfer agent. The tube is welded shut and as more and more of the uranium-235 undergoes fission, fissures develop in the fuel allowing the alkali metal to enter the voids. The sodium extracts an important fission product, namely cesium-137, and hence become intensely radioactive.

The liquid alkali metal drained and removed from the coolant system and/or removed from spent fuel elements must be disposed of in a safe and secure manner. However, before final disposal, the alkali metals must be deactivated, especially sodium, to reduce its reactivity.

Several methods have been suggested for treating the sodium or sodium-potassium alloy to deactivate before disposal. U.S. Pat. No. 4,032,614 discloses a method for contacting molten alkali metal with a caustic solution thereby forming an alkali metal hydroxide. However, this method is carried out at increased temperatures with a concomitant production of hydrogen gas. The high temperatures used in this process increase the possibility of a hydrogen explosion thereby presenting an additional safety hazard. Furthermore, the method produces large quantities of caustic material which is considered hazardous due to its corrosivity. As such, disposal becomes a problem because the Environmental Protection Agency considers this caustic material as "mixed waste" due to its hazardous characteristics and radioactive content. Accordingly, the caustic material has to be disposed of in a hazardous waste site. Still further, this method has the limitation of not being applicable for dissolving and removing any deposited alkali metal remaining on process equipment, tools or in the circuit loops of the reactor.

U.S. Pat. No. 5,678,240 overcomes the problems presented when producing alkali metal hydroxides by further converting the caustic waste materials to alkali metal carbonates. This method eliminates the concern for disposal of hazardous corrosive materials but includes several steps that involve the initial conversion to a hydroxide. As such, concerns for generating explosive hydrogen gas is still applicable. Furthermore, this method may not be used for final wash out of a reactor's coolant systems to remove any remaining scale or solids.

Accordingly, a need exists for improved methods for deactivation of metal coolants removed from a nuclear reactor that reduces the production of explosive hydrogen gas and/or hazardous caustic materials, do not leave solid deposits and residue on process equipment after deactivation and may be used in a final in situ decontamination of a reactor's coolant systems.

SUMMARY OF THE INVENTION

Terms

For purposes of this invention, the terms and expressions below, appearing in the specification and claims, are intended to have the following meanings:

"Precipitating agent" as used herein means a compound that ionizes in an ammoniacal liquid such as anhydrous liquid ammonia to form an anion that combines with an alkali or alkaline earth metal cation to form a alkali or alkaline earth metal salt.

"Breeder Reactor" as used herein means a nuclear reactor wherein the amount of plutonium produced exceeds the amount of plutonium consumed.

"Precipitating ammoniacal mixture" as used herein is a mixture containing a precipitating agent dissolved and ionized in an ammoniacal liquid.

"Metal coolants" as used herein means alkali and alkaline metals and mixtures thereof, either in a liquid or solid state, that have been used as circulating liquid coolant in a nuclear reactor or as heat transfer agents included within fuel element tubes. These metal coolants or heat transfer agents may contain other contaminates such as radioactive materials.

"Ammoniacal liquid" as used herein means solutions having an ammonia content ranging from at least 50 percent-by-weight of ammonia in water to anhydrous liquid ammonia.

Accordingly, it is a principal object of the present invention to provide improved methods for deactivating alkali metals used as liquid coolant in nuclear reactors that are safe and efficient without generating large quantities of caustic hazardous material and/or hydrogen gas.

Yet another object of the invention is to provide a method for removing solidified metal coolant residue from process equipment, tools and/or in primary and secondary circuit loops of a nuclear reactor's cooling system.

Still another object of the present invention is to provide a method of deactivating metal coolants such as alkali metals at lower temperatures to substantially reduce the possibility of an explosion of any hydrogen gas that may be generated during the deactivation process.

A further object of the present invention is to provide a method for deactivating alkali metals removed from a reactor system to generate a solid non-hazardous waste product that can be landfilled in a sanitary landfill or stored as low level radioactive waste in a disposal site.

A still further object of the present invention is to provide a method that not only deactivates liquid alkali metals removed from a breeder reactor but also detoxifies hazardous materials thereby rendering both the liquid alkali metal and hazardous waste as a non-hazardous waste stream.

Yet another object of the present invention is to provide a method for deactivation of alkali metals removed from or included within spent fuel elements.

These and additional objects are provided by the processes of the present invention which are directed to the deactivation of metal coolants removed from nuclear reactor coolant systems. A liquid alkali or alkaline earth metal can be deactivated by combining with a precipitating agent, both of which are soluble in liquefied ammonia to form a precipitating compound. Particularly, sodium and sodium-potassium alloys can be deactivated by contacting the alkali metal with an excess of an ammoniacal liquid such as anhydrous liquid ammonia to form a reaction mixture which when combined with a precipitating agent that substantially dissolves and ionizes in the ammoniacal liquid forms an alkali metal salt precipitate. The reaction mixture comprises a solution of solvated alkali metal cations and electrons that combine with an ionizable compound for precipitating an alkali metal salt. The resulting alkali metal salt precipitate may have a reduced solubility in the ammoniacal liquid when compared to that of the original precipitating agent and alkali metal thereby providing for easy separation of the precipitate from the ammonia solution.

In one preferred embodiment of the invention, the process comprises the step of combining two mixtures, a reaction mixture comprising an alkali metal coolant removed from a reactor, either in solid or liquid form, introduced into a reaction vessel containing an ammoniacal liquid such as anhydrous liquid ammonia wherein the alkali metal is solubilized thereby forming alkali metal cations and solvated electrons. The alkali metal is introduced into the reaction mixture in an amount not exceeding the solubility of the alkali metal in the ammoniacal liquid ammonia. A precipitating ammoniacal mixture comprising a precipitating agent solubilized and/or ionized in anhydrous liquid ammonia is combined in the reaction vessel with the solvated alkali metal cations and electrons. The combining of ions in the reaction vessel forms an alkali metal salt which may be removed from the reaction vessel. The anhydrous liquid ammonia may be evaporated from the reaction vessel and recovered for future use.

The processes of the present invention further contemplate in situ deactivation and recovery of solidified metal coolant from surfaces of a reactor coolant system, process equipment, tools and any other surfaces encrusted with solidified alkali or alkaline earth metal. Accordingly, in a preferred method an ammoniacal liquid such as anhydrous liquid ammonia is circulated through the coolant system, that being the primary and secondary loops and any other loops or surfaces exposed to the liquid metal coolant, to dissolve any remaining metal liquid coolant that solidified as a scale and/or became trapped in the coolant system after initial drainage of the molten metal. The anhydrous liquid ammonia is pumped through the coolant system under pressure to maintain the anhydrous ammonia in a liquefied state. The anhydrous liquid ammonia is circulated until a sufficient amount of the solidified metal, such as alkali metal is dissolved in the liquid ammonia and then removed from the coolant system. Upon removal from the system, the ammonia solution comprising solvated alkali metal cations and electrons is combined with a precipitating agent that solubilizes and ionizes in ammoniacal liquid. The combined mixtures effect the precipitation of an alkali metal salt.

The present processes provide significant advantages over prior art methods, in that, the final waste product may be an alkali or alkaline earth metal salt which is not considered a hazardous material. In fact, liquid alkali metal circulating in the secondary loop of a reactor's cooling system is usually considered non-radioactive, assuming there has not been a leak between the primary and secondary circuit, and the precipitated alkali metal salt can be disposed of in a non-RCRA controlled landfill. Additionally, the process may be utilized for in situ decontamination which dissolves and removes solidified alkali metal from the coolant system for further treatment with a reagent that yields an alkali metal salt. Still further, because of the lower temperatures in the reaction vessel there is a reduced risk of an accidental explosion of any hydrogen gas that may form during the reaction. Yet another advantage of the present process is the substantial reduction of the production of hydrogen gas by selectively choosing a precipitating agent that has a cation or anion that may be reduced in the reaction mixture by solvated electrons.

BRIEF DESCRIPTION OF THE DRAWINGS

The following detailed description will be more fully understood in view of the drawings in which.

DESCRIPTION OF THE PREFERRED EMBODIMENT

The processes of the present invention are directed to the deactivation of alkali or alkaline earth metal used as liquid coolant and/or heat transfer agents in nuclear reactor systems. For purposes of explanation, sodium will be used as a representative of an alkali metal but this is not intended to be a limitation of the invention.

Figure 1:
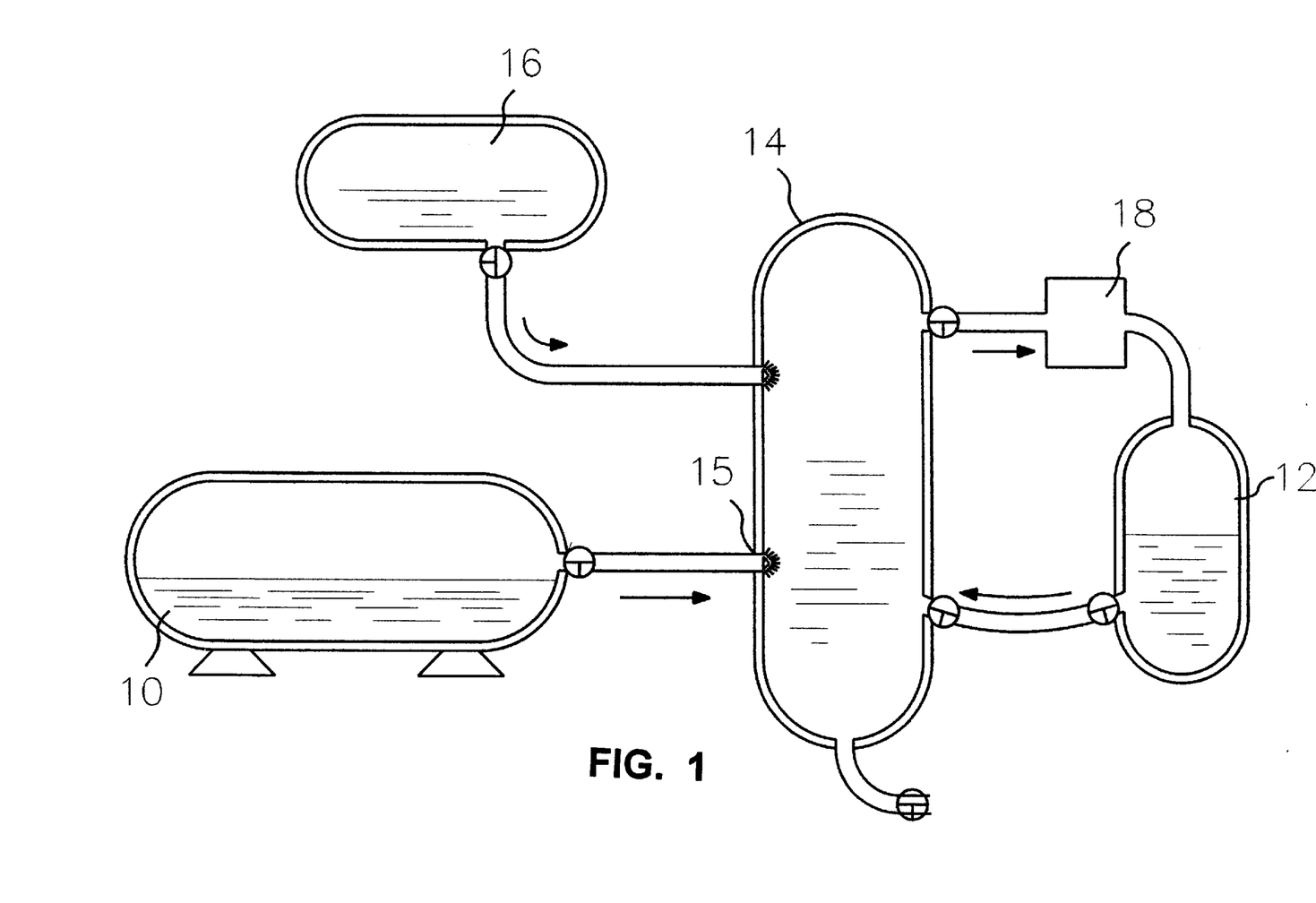
FIG. 1 is a flow diagram of the deactivation process of the present invention showing the system for converting an alkali metal to an alkali metal salt.

Methods of the present invention can be demonstrated by reference to FIG. 1 which teaches that molten sodium can be accumulated in a storage tank 10 at a temperature ranging from about the melting point of 98° C. to less than the boiling range of 883° C. to maintain the sodium in a liquid state, and preferably, from about 110° C. to 200° C. The sodium can be pumped from the storage tank 10 or directly from a source such as the primary or secondary coolant system of a breeder reactor. From the storage tank 10, the molten sodium may be injected into a reaction vessel 14 which is charged with an ammoniacal liquid in a sufficient amount to dissolved the injected alkali metal. Preferably, the reaction vessel is charged with at least a stoichiometric excess (greater than a 1:1 mole ratio) of the ammoniacal liquid ammonia to dissolve the alkali metal. The ammoniacal liquid is preferably anhydrous liquid ammonia, but solutions of at least 50 percent-by-weight of ammonia in water can also be employed.

The temperature and/or pressure in the reaction vessel is controlled to maintain the anhydrous ammonia in a liquefied state. The pressure may range from about 15 psi to about 200 psi. The pressure range will be dependent upon the temperature generated by the reaction within the vessel and whether the vessel is being cooled by an outside cooling system. Accordingly, if the reaction is carried out under normal atmospheric pressure then the temperature should be maintained at or below −30° C. by any means known in the art. Alternatively, if the pressure within the reaction vessel is increased then the temperature may rise above −30° C.

The molten sodium may be injected or pumped under pressure into the reaction vessel through nozzle 15 that atomizes the sodium at a controlled rate to facilitate dissolution of sodium in the ammoniacal liquid under stirring conditions. The amount of sodium introduced into the reaction vessel should not exceed the solubility of sodium in anhydrous liquid ammonia at the specific temperature and pressure within the reaction vessel.

When sodium and other alkali metals dissolve in an ammoniacal liquid, such as anhydrous liquid ammonia, solvated electrons are chemically generated. The sodium becomes a cation by losing a valence electron as illustrated in the following equation:

The ammonia molecules of the solvent surround the charged electrons which provide stability so the sodium ions do not react with the solvated electrons. Instead, the sodium ions are free to react and/or combine with a reagent that provides a combinable anion to form a sodium salt precipitate or an easily separated sodium complex.

The sodium cations and solvated electrons in the reaction vessel 14 are next introduced and combined with a precipitating agent that upon ionization in the liquid ammonia will provide an anion for combining with the sodium cation to form a salt precipitate.

Generally, any precipitating agent that ionizes in ammoniacal liquid and provides an anion to combine with the sodium cation for precipitating a sodium salt may be used in the present invention. Preferably, the precipitating agent is selected from the group consisting of ammonium chloride, water, hydrogen chloride, ammonium nitrate, sodium nitrate, nitric acid, ammonium sulfate, ammonium chromate, ammonium dichromate, ammonium perchlorate, ammonium iodate, ammonium periodate, ammonium benzoate, and metal halides such as zinc halides, copper halides and nickel halides. More preferably, the precipitating agent is selected from the group including ammonium chloride, copper chloride and ammonium nitrate. The precipitating agent may be solubilized in an ammoniacal liquid in a precipitating agent tank 16 before introduction to the reaction vessel 14. The ionizable precipitating agent is added to the ammoniacal liquid in an amount not exceeding the solubility of the precipitating agent in the liquid ammonia at the specific temperature and pressure within the reaction vessel.

The precipitating ammoniacal mixture may be introduced into the reaction vessel under stirring conditions to insure a homogenous reaction mixture. To form a salt precipitate, a sufficient amount of this mixture may be introduced so that the amount of the anion of the precipitating agent and the sodium cation brought together exceed the solubility of the ionic compound formed by their union. For instance, when using ammonium chloride $NH_4Cl$ as the precipitating agent, the concentrations of the sodium cations $Na^+$ and the chloride anions $Cl^-$ from $NH_4Cl$ will exceed the solubility of sodium chloride $NaCl$ in liquid ammonia thereby forming a salt precipitate. To insure the maximum amount of cations or $Na^+$ to precipitate from the solution as $NaCl$ an excess of the precipitating reagent $Cl^-$ may be added to the solution.

Thus, a liquid ammonia solution of the active metal sodium reacts with ammonium chloride with the evolution of hydrogen and the formation of the corresponding alkali metal chloride.

The precipitating salt can be removed from the reaction vessel by any means of separation including venting the liquid ammonia, removing the salt from the reaction vessel by filtration, spray drying, and or evaporation.

Because ammonium chloride may cause the production of hydrogen gas an alternative precipitating agent may be utilized, that being a precipitating agent that upon ionization has an anion that can be reduced, such as ammonium nitrate. A solution of anhydrous liquid ammonia containing dissolved ammonium nitrate can form precipitates without the production of hydrogen. For instance, when the sodium is introduced either directly or indirectly into an ammoniacal solution of ammonium nitrate, the sodium is deactivated without the evolution of hydrogen. The alkali metal sodium is added in an amount to provide sufficient solvated electrons to reduce the anion of the dissolved precipitating agent. Preferably, the sodium is added in at least a 1:1 ratio, and more preferably, sodium and ammonium nitrate react in the approximate ratio of 2:1, a ratio required for the following reaction.

The sodium metal is deactivated without the concomitant production of hydrogen gas when an excess of sodium is introduced into the ammonia solution containing ionized ammonium nitrate. It is believed that the solvated electrons formed during the dissolution of the sodium metal act as a powerful reducing agent and are consumed by the reduction of the nitrate anion forming a nitrite wherein the nitrogen atom has a lower oxidation number.

Also, precipitating reagents that reduce the production of hydrogen gas when deactivating an alkali metal may include metal halide agents that upon ionization provide a cation that can be reduced, such as copper halides, zinc halides, magnesium halides, cadmium halides and mixtures thereof. The primary result upon the treatment of an alkali metal, such as sodium, with a metal halide, such as copper chloride, in liquid ammonia may be represented by the equation:

$$CuCl_2 + 2Na \rightarrow Cu + 2NaCl$$

The metal cation is reduced to a free metal with a concomitant metal replacement reaction forming a metal salt. The free metal, acting as a catalyst, will frequently cause the formation of an amide, as a secondary reaction such as shown below:

$$2Na + 2NH_3 \xrightarrow{Cu} 2NaNH_2 + H_2$$

This secondary reaction may be minimized by having a shorter time of reaction, rapid addition of the alkali metal and the use of the alkali metal in only a slight excess over the stoichiometric quantity.

When alkali metals dissolve in anhydrous liquid ammonia, several side reactions may also occur including the generation of amides, as shown above, and/or hydrides as shown by the following equations:

$$Na^0 \xrightarrow{dissolve\ in\ NH_3} Na^+ + e^-$$
$$Na^0 + NH_3 \longrightarrow Na^+ + NH_2^- + \tfrac{1}{2} H_2 \quad or$$
$$\tfrac{1}{2} H_2 + e^- \longrightarrow H^-$$
$$H^- + Na^+ \longrightarrow NaH$$

During the processes, anhydrous liquid ammonia can be slowly vented from the reaction vessel to reduce the overall temperature within the reaction vessel. The unvented anhydrous liquid ammonia is allowed to expand slightly in the vessel with a concomitant cooling effect which is transferred to the reaction mixture. This reduction in temperature counteracts any heat generated by the reaction of the precipitating reagent with the sodium cation. Therefore, the formation of a precipitating alkali metal salt may proceed without overheating. Moreover, a reduced temperature decreases the possibility of an explosion of any hydrogen gas that may form during the reaction.

The vented ammonia may be scrubbed in scrubber 18 which will remove any hydrogen gas that may form during the reaction and the cleaned ammonia can be stored in vessel 12 to be reused for recharging of the reaction vessel.

Although the present invention has been described in terms of combining a reaction mixture with a precipitating ammoniacal mixture in a two step batch process, it should be clear that the deactivation methods of the present invention can be performed in a continuous process. In such a system, the formed precipitate is continuously removed while the reaction vessel is continuously recharged with anhydrous liquid ammonia. The alkali metal and precipitating agent can be introduced in a step process or simultaneously in controlled amounts.

Additionally, the precipitating agent may be added directly to the reaction vessel for ionization in the ammoniacal liquid within the reaction vessel without first being ionized in a separate ammoniacal mixture. In the alternative, the alkali metal may be directly introduced into an ammoniacal liquid which already contains a dissolved precipitating agent.

At some sites where a breeder reactor is being decommissioned, there may be an abundance of other hazardous agents or hazardous waste materials in addition to the radioactive materials associated with the breeder reactor. These hazardous wastes may be halogenated organics including chemical warfare agents, PCB compounds, highly halogenated toxic waste materials, halogenated insecticides and pesticides and other toxic materials or mixed waste stored on site waiting to be detoxified. Current methods of detoxification include incineration, neutralization and/or chemical processing. However, these methods can produce environmental concerns regarding atmospheric pollution and large quantities of additional waste material.

Considering these facts, this invention further contemplates processes wherein the solvated electrons generated in the reaction vessel are used to decontaminate hazardous materials. Methods for decontaminating hazardous wastes including halogenated materials, nonradioactive metals or metalloids, and radioactive mixed wastes, using solvated electrons are disclosed in U.S. Pat. Nos. 4,853,040, 5,495,062 and 5,613,238 all of which are incorporated-by-reference herein.

Accordingly, a halogenated hazardous waste material can be detoxified simultaneously with the deactivation of the alkali metal coolant thereby eliminating two different types of hazardous waste material with a single process. Briefly, this can be accomplished by introducing the halogenated hazardous waste material to the reaction vessel comprising an ammoniacal liquid, such as anhydrous liquid ammonia and an alkali metal wherein solvated electrons have been generated. The solvated electrons, acting as a reducing agent, should be in a sufficient amount to partially or completely dehalogenate a halogenated hazardous waste material to yield a compound(s) of lesser toxicity than the original waste material. In this process the uncombined halogen atoms that are removed from the halogenated compound may be combined with the alkali metal cation in the reaction vessel to form an insoluble alkali metal salt.

The detoxified hazardous waste and alkali metal salts are removed from the reaction vessel for disposal. The anhydrous liquid ammonia is vented and scrubbed for possible reuse in the reaction vessel.

Methods of the present invention further provide for the deactivation of alkali metal by dissolution of a precipitating agent in an ammoniacal liquid, such as anhydrous liquid ammonia with the subsequent addition of an alkali metal therein. Referring to FIG. 1, the closed reaction vessel 14 is charged with an excess of anhydrous liquid ammonia and the precipitating agent stored in tank 16 is introduced directly into the liquid ammonia. The precipitating agent is introduced in an amount so as to permit ionization of the agent. At this point, an alkali metal from storage tank 10 is introduced and dissolved in the anhydrous liquid ammonia thereby forming solvated electrons and cations. Upon dissolution, the alkali metal cations may combine with anions of the ionized precipitating agent and form a precipitating alkali metal salt. The precipitating salt may be removed from the reaction vessel or the liquid ammonia may be optionally vented for recovery and reuse.

Liquid alkali metal drawn from the primary, intermediate and/or any contaminated circuit of a cooling system, such as in a pool system may initially warrant decontamination to reduce the radioactivity of the alkali metals. The radioactivity may be reduced to unrestricted levels before being treated by the processes of the present invention for final disposal. Molten sodium removed from the primary circulating loop is contaminated with radioactive isotopes such as Na-24 which occurs due to neutron bombardment. The sodium in the primary loop enters the core of the reactor, and therefore, can be contaminated with uranium dioxide and fission products as a result of direct contact with the irradiated uranium dioxide in the core. By removing some of the fission products, including plutonium-239, before deactivation by the present process, the precipitated alkali metal salt may be disposed of in a low-level radioactive site where storage is less restrictive and monitoring is reduced because of the removal of any plutonium-239.

Any method that purifies and/or decontaminates sodium metal may be used as long as the sodium can be maintained in a liquid state or can resume a liquid state for further deactivation by the processes of the present invention. For instance, U.S. Pat. No. 3,854,933 discloses a method to remove impurities in metallic sodium, the contents of which are herein incorporated-by-reference. Briefly, calcium and/or magnesium and/or calcium-magnesium alloy are dissolved in the molten metallic sodium at a high temperature from about 450 to 850° C. Thereafter, these dissolved metals are precipitated at a lower temperature, that being, a little higher than the melting point of sodium (97.5° C.). As a result, nuclear fission products comprising elements from the group consisting of O, N, S, Sr, Ba, Sb, Sm, Pr, La, Ce, Ni, Si, Sn, Zn, Tl, Th, Pu, Rh, and Pb are separated from the sodium by chemically bonding with, adsorbing with and/or co-precipitating with the calcium and magnesium additives. Additionally, Na-24 formed in the molten metal by neutron bombardment is also removed because Na-24 acting as a magnesium atom precipitates when the molten solution is cooled to just above the melting point of sodium. After the impurities are removed the decontaminated sodium may be introduced directly into the reaction vessel for deactivation and precipitation by the methods of the present invention.

Figure 2:
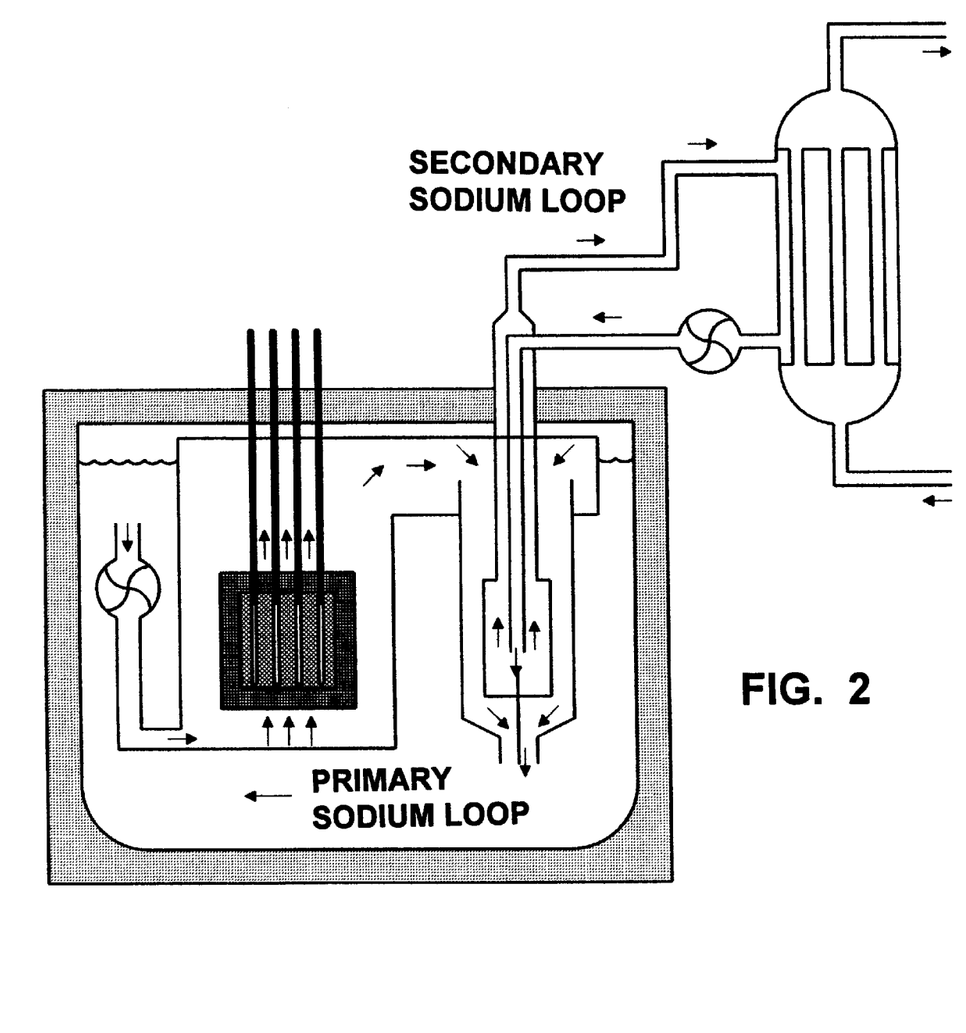
FIG. 2 is an illustration showing the circulating coolant system of a generic breeder reactor.
Figure 3:
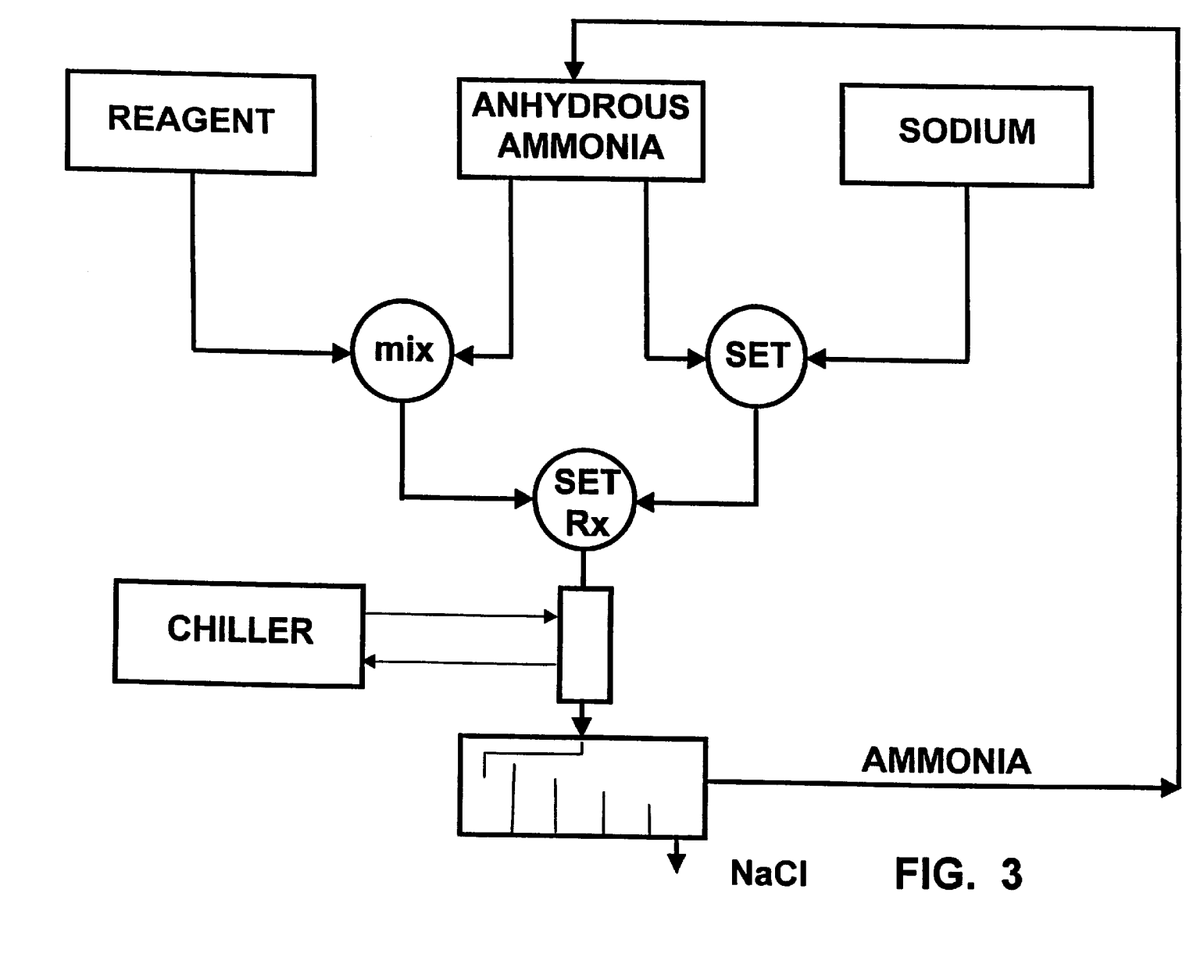
FIG. 3 is a schematic diagram of a preferred embodiment of the deactivation of alkali metal coolant according to the present invention.

In another embodiment of the present invention, the primary and secondary circuit loops of a breeder reactor may be deactivated in situ thereby removing any remaining solidified sodium metal after the bulk of the molten sodium has been drained. FIG. 2 illustrates a generic breeder reactor having separate and distinct primary and secondary circulating loops. The engineering design of the vessels and pipelines makes complete drainage of the system impossible, and therefore, the remaining sodium must be removed by other means. More important, by decontaminating the primary loop any radioactive fission products that may have contaminated the sodium in the loop are also removed thereby allowing the metallic hulk of the reactor to be shredded and disposed of as low-level radioactive waste.

The processes of the present invention are ideal for decontaminating the coolant circulating loops and removing any remaining metal coolant that has solidified on surfaces or in crevices within the reactor system. The process comprises several steps. In the first step, anhydrous liquid ammonia is circulated through the circuit loops at a pressure and temperature to maintain the anhydrous ammonia in a liquefied state. The present process exploits the physical dissolution of sodium in liquid ammonia. The anhydrous liquid ammonia is circulated through the system until it becomes saturated with sodium and/or reaches an acceptable level of sodium ions dissolved in the ammoniacal solution and then is removed from the circulating system.

After the ammoniacal liquid containing the dissolved sodium is removed from the system it may be directly introduced into the reaction vessel as shown in FIG. 1 for mixing with a precipitating agent.

In the alternative, the anhydrous liquid ammonia with the dissolved sodium may be removed and evaporated to recover the sodium. This route may be utilized if the sodium removed from the primary loop must be decontaminated to remove radioactive fission products. The sodium can be reheated and the method discussed above may be used to remove unwanted fission products and the decontaminated sodium may then be deactivated by the processes of the present invention.

The following specific examples demonstrate the invention, however, it is to be understood they are for illustrative purposes only and do not purport to be wholly definitive as to conditions and scope.

EXAMPLE 1

The deactivation of sodium in an ammoniacal liquid with a precipitating agent solubilized in the ammoniacal liquid was demonstrated by the following experiment:

A 5.3 gram sample of ammonium chloride was introduced into a 600 ml beaker containing 350 ml of $NH_3$ and solubilized under stirring conditions forming a reagent mixture. Pieces of sodium metal were slowly added to the reagent mixture forming a reaction mixture from which sodium chloride was precipitated. The reaction mixture did not maintain a blue color in the vortex of the stirring mechanism until more than 2.3 grams of sodium were added. At this point all the chloride ions, being the limiting reagent, had combined with the sodium cations and precipitated. The addition of extra sodium above the 2.3 grams into the ammoniacal liquid maintained the expected blue solution due to unused solvated electrons. This example demonstrates the ability of ammoniacal liquid to deactivate sodium when a reagent is added that forms an alkali metal salt precipitate which has a reduced solubility in ammoniacal liquid when compared to that of the original reagent and alkali metal.

EXAMPLE 2

A 7.0 gram sample of ammonium sulfate was introduced into a 600 ml beaker containing 350 ml of $NH_3$ under stirring conditions forming a reagent mixture. Sodium was slowly added to the reagent mixture forming a reaction mixture. The addition of sodium precipitated a limited amount of sodium sulfate. The reaction mixture maintained a blue color in the vortex of the stirring mechanism and remained a permanent blue after only 0.59 grams of sodium were added. The reaction mixture containing ammoniacal liquid maintained the expected blue solution due to solvated alkali metal cations and electrons. This example demonstrates that some reagents are more aggressive in precipitating an alkali metal salt and this may be dependent on the solubility of the precipitating agent in liquid ammonia.

EXAMPLE 3

Figure 4:
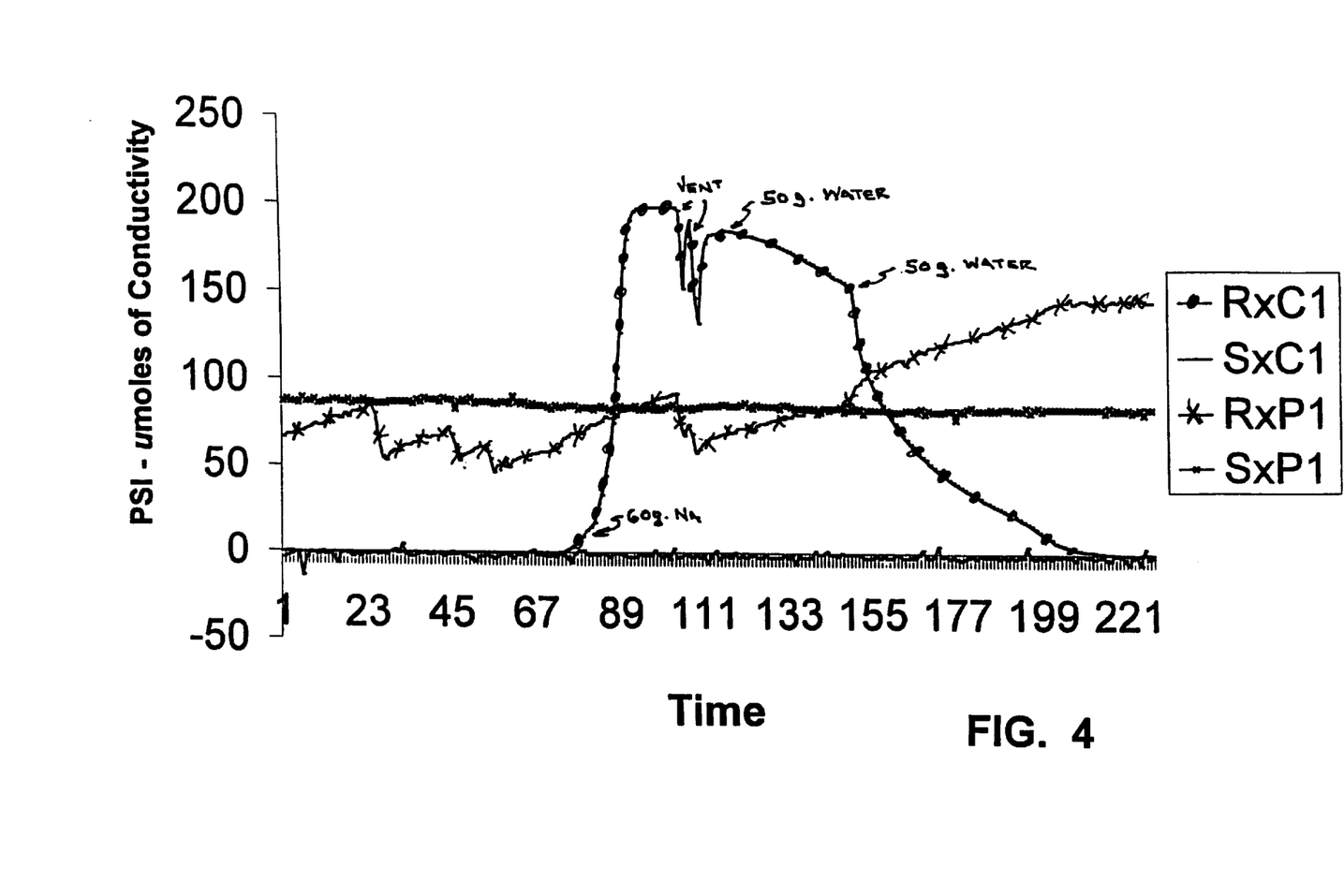
FIG. 4 is a reaction plot showing the deactivation of sodium in the presence of liquid ammonia and a precipitating agent.

A closed reaction vessel was charged with approximately 6 liters of liquid anhydrous ammonia. A 60 gram sample of metal sodium was introduced in the reaction vessel. The pressure within the vessel and the conductivity of the reaction mixture were monitored. With the addition of sodium to the reaction vessel the conductivity of the reaction mixture increased due to the sodium cations and solvated electrons formed during the solubilizing of sodium in liquid ammonia. This increase in conductivity is shown in FIG. 4 wherein the curve (labeled RxC1) rapidly increases. The pressure in the reaction vessel also increased as shown by the curve (labeled RxP1). The reaction vessel was vented to reduce the pressure with a concomitant reduction in the conductivity of the reaction mixture. 50 grams of water, which is a reagent soluble in liquid ammonia, was introduced into the reaction vessel. As evidenced by the decrease of the conductivity curve of the reaction mixture, the $H_2O$, which ionized in the ammonia, reacted with the sodium cations with the concomitant precipitation of sodium hydroxide. An additional 50 grams of water were added to the reaction vessel and the conductivity of the reaction mixture gradually decreased as the sodium cations combined with the hydroxyl ions forming the alkali metal salt precipitate. It is believed that the pressure in the reaction vessel increased as the solvated electrons combined with the hydrogen protons in solution and formed hydrogen gas.

EXAMPLE 4

A 23 gram sample of metal sodium was introduced into a closable and pressurizable reaction vessel equipped with a stirring mechanism. The reaction vessel was assembled and charged with approximately 1.3 liters of anhydrous liquid ammonia. Upon completion of the ammonia addition the solution within the vessel had the typical blue color of a solution containing solvated electrons. The pressure within the vessel was initially about 110 psi which slowly increased to 120 psi with a temperature within the vessel of approximately 21–22° C. The temperature was adjusted to approximately 5–6° C. by venting the ammonia to reduce the internal temperature within the reaction vessel. The pressure was reduced to approximately 64 psi.

33 grams of ammonium nitrate were added to a separate lock hopper. Liquid anhydrous ammonia was introduced into the lock hopper for the purpose of dissolving and ionizing the ammonium nitrate before introduction into the reaction vessel. The lock hopper was connected to the reaction vessel via a top and bottom valve. The top valve of the hopper was opened allowing the ammonium nitrate solution to be pumped into the reaction vessel. Initially, as the ammonium nitrate ammoniacal solution was introduced into the reaction vessel the pressure and temperature within the vessel increased to 117 psi and 120° C., respectively. After approximately 2 minutes, the pressure dropped to about 112 psi while the temperature held steady. The solution in the reaction vessel still maintained the blue color.

At this point the bottom valve of the hopper was opened and an additional amount of the ammonium nitrate ammoniacal solution was introduced into the reaction vessel. At 3 minutes into the reaction, the pressure and temperature in the vessel increased to 190 psi and 26° C., respectively and the blue color of the solution in the reaction vessel disappeared. As time progressed the pressure started to decrease within the reaction vessel while the temperature held steady. At 4 minutes into the reaction the pressure was approximately 148 psi and at 6 minutes the pressure was down to 144 psi.

| EVENT | TIME (MIN) | TEMPER- ATURE (C) | PRESSURE (PSI) |
|---|---|---|---|
| Reaction vessel containing sodium in liquid anhydrous ammonia | T = 0 | 8 | 67 |
| Top valve of hopper opened, ammonium nitrate solution introduced into reaction vessel | T = .5 | 12 | 117 |
| Bottom valve of hopper opened | T = 2 | 17 | 106 |
| | T = 3 | 26 | 190 |
| | T = 4 | 29 | 148 |
| | T = 6 | 28 | 144 |

While not wishing to be bound by any specific mechanism of action, it is believed that several different reactions occurred including the deactivation of sodium and a secondary reaction that competed for the consumption of solvated electrons thereby reducing the formation of hydrogen gas. Solvated electrons are chemically generated as illustrated in the following equation:

$$Na^0 \xrightarrow{\text{dissolve in } NH_3} Na^+ \text{(solvated)} + e^- \text{(solvated)}$$

A possible explanation for the reduction of pressure within the vessel after the introduction of the ammonium nitrate ammoniacal solution may include the decrease of hydrogen gas produced because the solvated electrons acting as reducing agents are consumed in the reduction of the $NO_3^-$ anion, wherein the N has a +5 oxidation state, to $NO_2^-$ wherein the oxidation state is reduced to +3 such as shown in the following equation:

$$NH_4NO_3 + 2Na = NH_3 + NaNO_2 + NaOH$$

Thus, if the formation of hydrogen gas is reduced the pressure in the vessel will decrease while the alkali metal salt precipitates are generated.

It can be shown by the above examples and description that the present process provides a safe and efficient method for deactivating molten alkali metals removed from nuclear reactors by forming an easily disposable alkali metal salt precipitate.

EXAMPLE 5

A 68 gram sample of copper chloride may be introduced into a closable and pressurizable reaction vessel that is equipped with a stirring mechanism. The reaction vessel is assembled and charged with approximately 3 liters of anhydrous liquid ammonia or a sufficient amount to dissolve and ionize the copper chloride therein and to dissolve the sodium metal that will be introduced subsequent to the addition of copper chloride. The temperature in the vessel may be adjusted to approximately 5–6° C. by venting the ammonia to reduce the internal temperature within the reaction vessel and to maintain the anhydrous liquid ammonia in a liquefied state.

23 grams of molten sodium metal is introduced to a separate vessel for later introduction into the reaction vessel. The lock hopper is connected to the reaction vessel via a valve. The valve of the hopper is opened allowing the molten sodium metal to be injected or pumped into the reaction vessel. A solution of solvated electrons is formed from the reaction of the liquid ammonia with the sodium metal introduced into the reactor. The addition of the metal may be in a one-time injection or by serial mode of addition.

The amount of molten sodium pumped into the reaction vessel is a slight amount greater than a stoichiometric amount for the reaction that being approximately twice the moles of the copper chloride according to the following equation:

$$CuCl_2 + 2Na \rightarrow Cu + 2NaCl$$

When the blue color typical of solvated electrons persists, the addition of further metal is terminated to eliminate any unwanted secondary reactions that may generate hydrogen gas. The solvated electron solution is quenched and the ammonia is allowed to evaporate and is recovered for further use. The sodium metal is deactivated and a sodium metal salt is generated without the production of hydrogen gas.

While not wishing to be bound by any specific mechanism of action, it is believed that the metal cation of copper chloride is reduced forming the free metal and the sodium chloride salt is formed. The solvated electrons are consumed by the reduction of the copper cation thereby competing with the possible production of hydrogen gas. The sodium chloride salt NaCl has a reduced solubility in the ammoniacal liquid when compared to that of the original precipitating agent $CUCl_2$ and alkali metal Na which will make for easy separation from the ammonia solution.

That which is claimed is:

1. A method for deactivating liquid alkali metal coolant and/or alkaline earth metal coolant removed from a nuclear reactor system, the method comprising the steps of:
   a) mixing an ammoniacal liquid with a liquid alkali metal coolant and/or alkaline earth metal coolant removed from a nuclear reactor coolant system in a reaction vessel to form a reaction mixture containing solvated electrons and alkali and/or alkaline earth metal cations;
   b) introducing a precipitating agent to the reaction mixture of step (a) to form a precipitating alkali metal salt and/or alkaline earth metal salt; and
   c) separating the alkali and/or alkaline earth metal salts from the ammoniacal liquid for disposal and/or further treatment.

2. The method of claim 1 wherein the liquid alkali metal coolant is sodium and the precipitating agent is a member selected from the group consisting of ammonium chloride, ammonium nitrate and copper chloride.

3. The method of claim 1 wherein the precipitating agent is in a stoichiometric amount to provide sufficient anions to combine with the alkali metal cations to form a precipitatable metal salt.

4. The method of claim 2 wherein the ammoniacal liquid is anhydrous liquid ammonia.

5. The method of claim 2 wherein the precipitating agent has a reducible anion when ionized in ammoniacal liquid to be reduced by solvated electrons in the reaction vessel.

6. The method of claim 5 wherein the amount of moles of the alkali metal is at least twice the amount of moles of the precipitating agent.

7. The method of claim 1 wherein the alkali metal is a member selected from the group consisting of sodium, potassium, lithium and a mixture thereof.

8. The method of claim 1 wherein the ammoniacal liquid is anhydrous liquid ammonia maintained at a pressure and temperature to remain in a liquefied phase in the reaction vessel.

9. The method of claim 5 wherein the precipitating agent is in at least a stoichiometric amount to consume solvated electrons generated by the dissolving alkali metal.

10. A method for deactivating liquid alkali metal removed from a coolant system of a nuclear reactor, the method comprising the steps of:
    a) creating a reaction mixture in a closed reaction vessel comprising:
       i) charging the closed reaction vessel with anhydrous liquid ammonia; and
       ii) introducing liquid alkali metal removed from a breeder reactor into the closed reaction vessel in an amount not exceeding the solubility of the alkali metal in anhydrous liquid ammonia, the alkali metal dissolved in the ammonia to form solvated electrons and alkali metal cations;
    b) introducing a precipitating agent that ionizes in the anhydrous liquid ammonia, the precipitating agent introduced in a sufficient amount to precipitate an alkali metal salt; and
    c) separating the anhydrous ammonia to yield the alkali metal salt for disposal or further treatment.

11. The method of claim 10 wherein the precipitating agent is a member selected from the group consisting of ammonium chloride and ammonium nitrate.

12. The method of claim 10 wherein the precipitating agent is introduced in a stoichiometric amount to provide sufficient anions to combine with the alkali metal cations to form the precipitating alkali metal salt.

13. The method of claim 10 wherein the precipitating agent has a reducible anion to be reduced by solvated electrons in the reaction vessel.

14. The method of claim 10 wherein the precipitating agent is water.

15. The method of claim 13 wherein the amount of moles of the alkali metal is at least twice the amount of moles of the precipitating agent.

16. The method of claim 10 wherein the alkali metal is a member selected from the group consisting of sodium, potassium, lithium and a mixture thereof.

17. A method for deactivating solidified alkali metal encrusted on surfaces within a coolant system of a nuclear reactor, the method comprising the steps of:
    a) introducing and circulating anhydrous liquid ammonia in the coolant system until the anhydrous liquid ammonia contains dissolved alkali metal to form a reaction mixture;
    b) introducing the reaction mixture to a closed vessel;
    c) introducing an ionizable precipitating agent into the closed reaction vessel thereby forming an alkali metal salt; and
    d) separating the anhydrous ammonia to yield the alkali metal salt for disposal or further treatment.

18. A method for deactivating alkali metal coolant and/or alkaline earth metal coolant used in a nuclear reactor system, the method comprising: solubilizing and/or ionizing the alkali metal coolant and/or alkaline earth metal coolant and a precipitating agent in an ammoniacal liquid, introducing the precipitating agent in a sufficient amount to combine with the ionized alkali metal and/or alkaline earth metal to form an alkali metal salt and/or alkaline earth metal salt.

19. A method for deactivating molten alkali metal removed from a coolant system of a nuclear reactor while detoxifying a hazardous waste, the method comprising the steps of:
    a) mixing anhydrous liquid ammonia with molten alkali metal in a closed vessel to form a reaction mixture;
    b) introducing a hazardous waste material to the mixture of step (a) to form a precipitating alkali metal salt and detoxify the hazardous waste; and
    c) separating the anhydrous ammonia to yield the alkali metal salt and detoxified waste for disposal or further treatment.

20. A method for deactivating liquid alkali metal removed from a coolant system of a nuclear reactor, the method comprising the steps of:
    a) mixing anhydrous liquid ammonia with a precipitating agent in a closable reaction vessel wherein the precipitating agent is ionized in the anhydrous liquid ammonia;
    b) introducing a liquid alkali metal to the mixture of step (a) to form a precipitating alkali metal salt; and
    c) separating the anhydrous ammonia to yield the alkali metal salt for disposal or further treatment.

* * * * *